United States Patent [19]

Whetham et al.

[11] Patent Number: 4,654,589

[45] Date of Patent: Mar. 31, 1987

[54] APPARATUS AND METHOD FOR IDENTIFYING A REFERENCE LOCATION FOR A WORK PIECE

[75] Inventors: William J. Whetham, Seattle; Harold J. Hutchinson, Sumney, both of Wash.

[73] Assignee: The Boeing Company, Seattle, Wash.

[21] Appl. No.: 537,495

[22] Filed: Sep. 30, 1983

[51] Int. Cl.$^4$ .................. G01B 7/14; G08C 19/06; G08C 19/12
[52] U.S. Cl. .................. 324/207; 340/870.31
[58] Field of Search .................. 324/207, 208, 260; 336/45, 127; 340/870.31, 870.32

[56] References Cited

U.S. PATENT DOCUMENTS

| 1,687,637 | 10/1928 | Reynders | 324/207 |
|---|---|---|---|
| 2,283,277 | 5/1942 | Modine . | |
| 2,673,404 | 3/1954 | Abrahamson . | |
| 2,827,609 | 3/1958 | Smith . | |
| 2,878,445 | 3/1959 | Scarborough | 324/208 |
| 2,903,645 | 9/1959 | Wright et al. . | |
| 3,027,951 | 4/1962 | Knapp et al. . | |
| 3,636,767 | 1/1972 | Duffy . | |
| 3,676,765 | 7/1972 | Westcott . | |
| 3,911,592 | 10/1975 | Crask . | |
| 3,956,618 | 5/1976 | Gotz . | |
| 3,982,184 | 9/1976 | Sanderson . | |
| 4,225,867 | 9/1980 | Gell . | |
| 4,319,109 | 3/1982 | Bowles . | |

FOREIGN PATENT DOCUMENTS 972791 9/1959 Fed. Rep. of Germany .
2035566 6/1980 United Kingdom .

Primary Examiner—Ernest F. Karlsen
Assistant Examiner—Walter E. Snow
Attorney, Agent, or Firm—Hughes & Cassidy

[57] ABSTRACT

A referencing member capable of generating an oscillating magnetic field is placed at the inside surface of a layup mandrel. A locating member, comprising a plurality of spaced electrical coils is placed on the other side of the layup mandrel. By energizing the reference member to create the oscillating magnetic field, the effect of the field on the coils can be used to sense position of the locating member and thus determine a reference location on the outside surface of the mandrel. Thus, production components of a structure being fabricated can be properly located.

22 Claims, 7 Drawing Figures

APPARATUS AND METHOD FOR IDENTIFYING A REFERENCE LOCATION FOR A WORK PIECE

The Government has rights in this invention pursuant to Contract No. F19628-70-C-0218 awarded by the U.S. Air Force.

BACKGROUND OF THE INVENTION

The present invention relates to an apparatus and method for making an identification of a reference location relative to a work piece.

BACKGROUND ART

There are any number of situations where it is necessary to identify a reference location on a work piece, for example, to perform a working operation on the work piece or possibly to add other material to the work piece. For example, in the aircraft industry, some structural components are made by applying alternate layers of fiber reinforced sheets and honeycombed core against a lay-up mandrel. Since it is necessary to locate these component parts within reasonably close tolerances relative to the underlying mandrel, some means must be provided for referencing these components relative to the mandrel. One method of accomplishing this is by optical tooling. Thus, as successive layers of fiber glass sheet material and honeycomb are put in place, the optical tooling can be used to indicate reference locations on the newly applied material. While this procedure can be used effectively, it necessitates the presence of trained personnel and specialized equipment.

Another method of referencing is to employ magnets, and then use Hall effect devices to locate the magnetic field. However, this techique is limited in accuracy due to variations in the earth's magnetic field.

A search of the patent literature has revealed a number of approaches to the problem of locating one component relative to another. While not all of these are considered to be particularly relevant to the present invention, these are disclosed herein to insure that there has been a complete disclosure of all prior art which may have some relevance.

U.S. Pat. No. 2,283,277, Modine, shows an indicator used to ascertain the direction of the swinging of a golf club. A number of solenoids are placed adjacent a ground surface, and as the club head is moved toward the ball location above the solenoids, there is an indication of the club's path.

U.S. Pat. No. 2,673,404, Abrahamson, shows what is called a "Magnetic Game Apparatus" where a magnetic circuit is closed by placing a probe over an iron disc, with the disc being concealed by the game board. A switch is closed to turn on a light.

U.S. Pat. No. 2,827,609, Smith, illustrates an apparatus to determine the distance between a magnet and a metallic surface to determine coating thickness.

U.S. Pat. No. 2,903,645, Wright et al, discloses an apparatus similar to the Smith patent noted immediately above.

U.S. Pat. No. 3,027,951, Knapp et al, shows a method of locating a pipe of a submarine well, thus enabling well tools to be inserted into the well. A magnet or electromagnet is placed at the location of the well head, and four sensing members, each having a magneto resistive element, are placed at four spaced locations. The proximity of the sensing elements to the well head are determined by virtue of the change of resistance in the detectors.

U.S. Pat. No. 3,636,767, Duffy, shows a tachometer-type device to measure fluid flow.

U.S. Pat. No. 3,676,765, Westcott, shows a tachometer generator.

U.S. Pat. No. 3,911,592, Crask, shows a tilt detector which uses two differential transformers mounted on floats. When the vessel tilts, the liquid level changes, thus raising or lowering the cores of the transformers.

U.S. Pat. No. 3,956,618, Gotz, shows an apparatus for determining the position of a piece of ferrous material. This uses a plurality of two-dimensional differential transformers. There is also disclosed a computer circuit which generates signals corresponding in sign and magnitude to the components of the deviation of the object.

U.S. Pat. No. 3,982,184, Sanderson, shows a display system for electrical phase differences.

U.S. Pat. No. 4,225,867, Gell, shows an orientation system adapted to be mounted within a vehicle.

U.S. Pat. No. 4,319,109, Bowles, and U.S. Pat. No. 4,334,135, Smith, both show devices to locate a food container over a cooking element, where there is induction heating of the container.

British Patent Application No. 2,035,566 illustrates a device for measuring the distance between a magnet and a metallic surface to determine coating thickness.

German Pat. No. 972,791 uses a coil and a magnetic pointer to determine the flatness of a surface.

SUMMARY OF THE INVENTION

The method of the present invention is to make a physical identification of a reference location on a work piece. There is provided a base member having a reference axis extending from the base member to a working area.

A referencing member is located at the base member at a first location which is aligned on the reference axis. The referencing member comprises magnetic reference coil means capable of generating an oscillating magnetic field.

A work piece is placed in the working area adjacent the base member, with the work piece having an exposed surface portion. There is provided a locating device at the working area adjacent to the exposed surface portion. The device has a locating axis and a plurality of magnetic sensing coil means at spaced locations relative to the locating axis.

The referencing coil means and the sensing coil means is energized to cause alternating current to flow through the reference coil means and the sensing coil means to create interacting alternating magnetic fields between the referencing coil means and the sensing coil means.

Current through the sensing coil means is sensed as a function of position of the sensing coil means relative to the referencing coil means. The locating device is moved relative to the reference axis in response to sensing of current in said sensing coil means to bring said locating axis into a predetermined alignment position relative to the reference axis. Then a physical identification of location of the locating device relative to the work piece is made. Thus, location of the work piece relative to the reference axis can be ascertained.

Desirably, the locating device is provided with foot means adapted to engage the work piece and orient the locating device relative to the work piece. The locating device is moved relative to the work piece by engaging the foot means with the work piece.

In the preferred embodiment, there are at least two sensing coil means spaced oppositely relative to the locating axis, and location of the locating device is ascertained by sensing relative electric current differences in said two coil sensing means. In the preferred form, the two sensing coil means are connected in a bridge circuit, and relative differences of current in the two sensing coil means is ascertained by detecting an imbalance in the bridge circuit.

In the preferred circuitry of the present invention, the output from the bridge circuit is directed to a differential amplifier to provide an output related to imbalance of the bridge circuit. The output from the differential amplifier is applied to a phase detector which provides an output related to phase relationship and magnitude of the output from the amplifier. Then the output from the phase detector is directed to display means to indicate relative magnitude of currents of said two sensing coil means. In the preferred form, phase shifter means is used to apply a reference signal to the phase detector means in proper phase relationship with the output from the differential amplifier.

Desirably, there are at least two pair of sensing coil means, with the sensing coil means of each pair being spaced oppositely from one another relative to the locating axis. In other respects, the two pair of sensing coil means are used similarly to one another.

In one embodiment, the referencing coil means is energized by applying an oscillating current directly to the referencing coil means, and the sensing coil means are energized by applying alternating electric current directly to the sensing coil means. In another form, the referencing coil means is energized by applying alternating current directly to the referencing coil means, and the sensing coil means are energized by an oscillating magnetic field of the referencing coil means inducing current in said sensing coil means.

In the specific configuration shown herein, the referencing system has a longitudinally aligned oscillating magnetic field axis, and the reference coil means is positioned so that said longitudinal axis is aligned with the reference axis.

In the system of the present invention, there is a base member, a referencing member, and a locating device as recited above. In addition, there is energizing means to cause alternating current to flow through the referencing coil means and the sensing coil means. Also, there is current sensing means operatively connected to the sensing coil means to sense current through the sensing coil means as a function of position of said sensing coil means relative to the referencing coil means and to provide an output corresponding to relative positions of the sensing coil means to the reference coil means. In other respects, the system of the present invention has operating components and circuit components arranged in the manner noted above.

The locating device of the present invention is desirably arranged in a manner to have four sensing coil means at four spaced locations around the locating axis. The display means comprises four indicators, generally physically aligned with related sensing coil means relative to the locating axis, whereby proximity of each sensing coil means to the reference axis is indicated by a related physically adjacent indicator.

Other features of the present invention will become apparent from the following detailed description.

DESCRIPTION OF THE PREFERRED EMBODIMENT

The present invention was developed to solve a particular manufacturing problem in the fabrication of aircraft structure. Accordingly, while the present invention has applications beyond use in this particular fabrication process, it is believed that a clearer understanding of the present invention will be achieved by first describing the method of fabricating such a structure and the difficulties of properly locating the component parts of the structure during fabrication. This will be followed by a description of the present invention.

Figure 1:
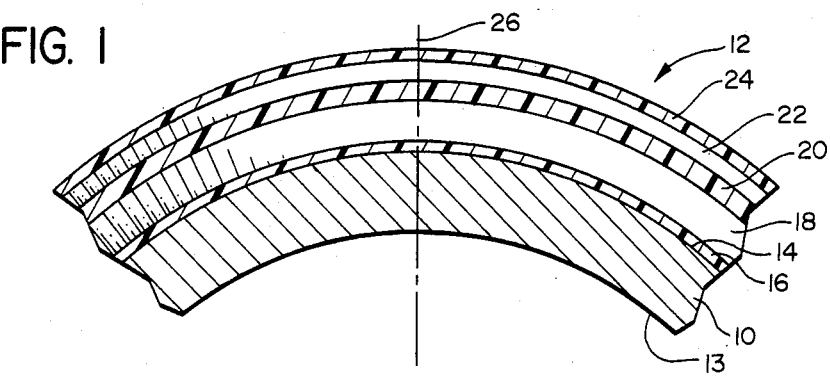
FIG. 1 is a sectional view through a portion of a prior art mandrel and its associated work piece, for which the apparatus and method of the present invention is particularly adapted to be used.

With reference to FIG. 1, there is shown a prior art lay-up mandrel 10 which is used to fabricate a particular type of honeycomb structure 12. In the particular configuration shown herein, this mandrel 10 has a generally torroidal configuration, and the sectional view of FIG. 1 is taken transverse to the periphery of the torroid.

This mandrel 10 has an inner surface 13 and an outer surface 14. During fabrication, a number of fiberglass sheets are laid one on top of another against the mandrel surface 14, with a bonding medium so as to form a first fiberglass layer 16. Then a layer of honeycomb structure 18 is laid against the fiberglass layer 16, after which a second fiberglass layer 20 is applied. As shown herein, there is yet one additional layer of honeycomb 22 applied and then a further fiberglass layer 24.

The honeycomb layers 18 and 22 are tapered in both directions laterally within reasonably close tolerances. To properly form the structure 12, it is necessary that the various structural components 16-24 be properly located relative to the underlying mandrel 10. In this particular arrangement of FIG. 1, there is an imaginary reference line 26 (commonly called the "water line") which extends at a particular location through the mandrel 10 and outwardly through the work area where the structure 12 is laid up on the mandrel 10. As one structural layer is applied to the mandrel 10, it is necessary to locate the water line 26 relative to the lay-up so that the subsequent structural material can be properly centered relative to the water line 26. As indicated previously, one common prior art method of doing this is by use of optical tooling. The present invention is intended to provide a relatively simple and yet effective means for locating the water line 26 in the work area where the structural components are being laid one on top of the other to make the end structure 12.

Figure 2:
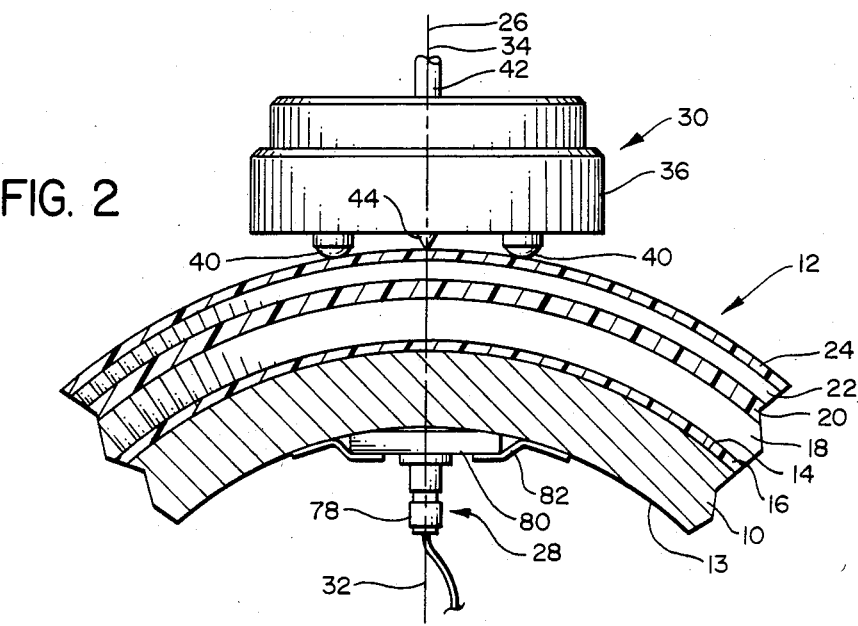
FIG. 2 is a sectional view of a portion of a mandrel with the structural work piece mounted thereon as in FIG. 1, and further illustrating the components of the present invention.
Figure 3:
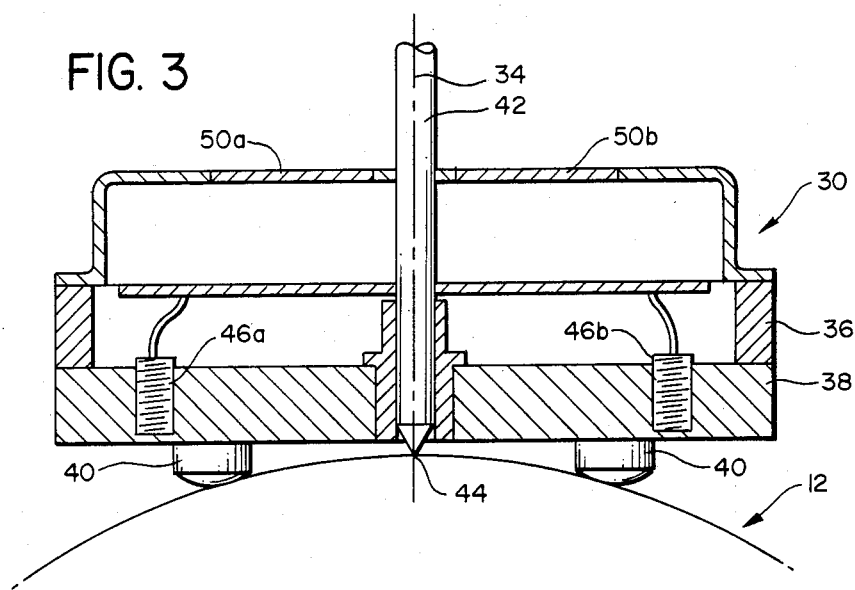
FIG. 3 is a sectional view of the referencing device of the present invention, taken along the center locating axis of the device.
Figure 4:
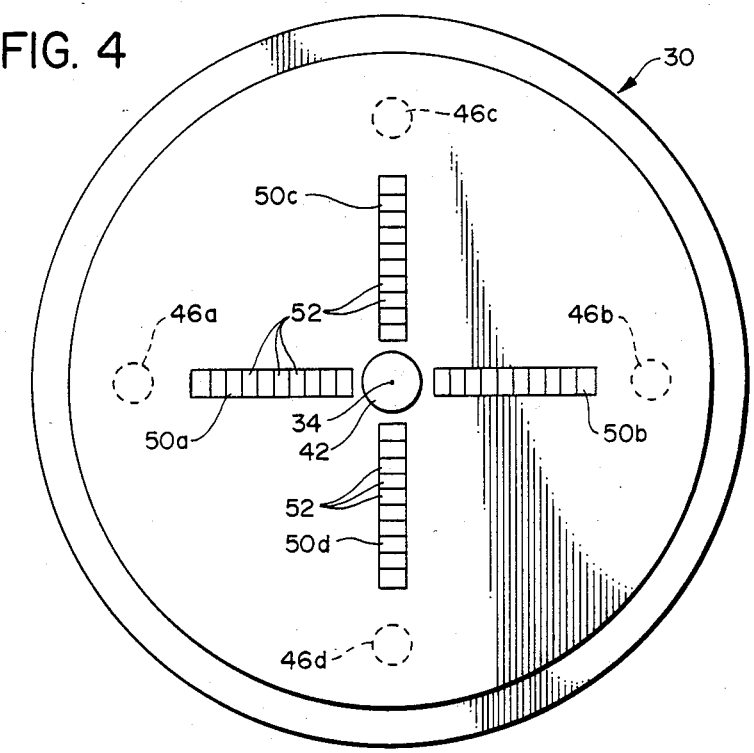
FIG. 4 is a top plan view of the device of FIG. 3.

With reference to FIG. 2, the apparatus of the present invention comprises a referencing member 28 and a locating member 30. The referencing member 28 is mounted at the inside surface 13 of the mandrel 10, and it serves as a transducer to provide an oscillating magnetic field having a longitudinally aligned magnetic field axis, identified as a reference axis 32, coinciding with the reference line 26. The locating member 30 is a hand held module which is responsive to the oscillating magnetic field generated by the referencing member 28. This locating member 30 has a locating axis 34, and by properly positioning the locating member 30 relative to the oscillating magnetic field generated by the referencing member 28, the locating axis 34 is brought into alignment with the reference axis 32. In this manner, the precise location of the reference axis 32 can be located exteriorly of the mandrel 10 in the work area occupied by the work piece 12.

The locating member 30 comprises a generally circular housing 36 which is sized so that it can conveniently be hand held. The housing 36 comprises a generally circular base 38 having four downwardly extending feet 40, spaced from one another in a square pattern. These feet 40 can be made of Teflon or some other low friction material.

At the longitudinal center line of the housing 36, there is a marking stylus 42 which is positioned so that its lengthwise axis is conincident with the locating axis 34. This stylus 42 is slide mounted so that it can be depressed to extend downwardly from the base 38, as shown in FIG. 2, to cause its pointed tip 44 to make a mark or impression that is coincident with the locating axis 34.

There are four sensors 46a-d mounted in the base member 38 symmetrically about the locating axis 34. These sensors 46a-d are arranged as two pairs, with the sensors of each pair being diametrically opposed relative to the locating axis 34, and with the four sensors 46a-d being arranged in a symmetrical square pattern, with the locating axis 34 as the center of the square.

In the particular configuration shown herein, each of the sensors 46a-d comprises a magnetic coil with a ferrous core, and each of the sensors 46a-d is aligned so that when it is energized to form an oscillating magnetic field, the longitudinal center axis of that field is aligned with the locating axis 34.

Mounted at the top surface of the housing 36 are four LED displays 50a-d. Each of the displays 50a-d is made up of a plurality of light emitting diodes 52 arranged in a straight line extending radially outwardly from the center locating axis 34 toward the location of a related one of the sensors 46a-d. As will be disclosed more fully later herein, the LED displays 50a-d are operatively connected to the sensors 46a-d in a manner that each LED display 50a, 50b, 50c and 50d indicates the relative distance of a related sensor 46a, 46b, 46c and 46d, respectively, from the reference axis 32. When a sensor 46 is moved further from the reference axis 32, the several diodes 52 of its related display 50 light up sequentially to indicate the increase in distance. By observing the four displays 50a-d and moving the locating member 30 in accordance with the information on the displays, the locating axis 34 of the member 30 can be brought into alignment with the reference axis 32 so as to ascertain the location of the reference axis 32 relative to the work piece 12. The precise manner in which this is accomplished will be discussed more fully later in this description.

The outer surface 14 of the mandrel 10 and of the outer surface of each component 16-24 of the work piece 12 are symmetrically arranged relative to the reference axis 26 so that when the locating device 30 is properly centered on the axis 26, the sensors 46a-d are positioned equally distant from the referencing member 28.

Figure 5:
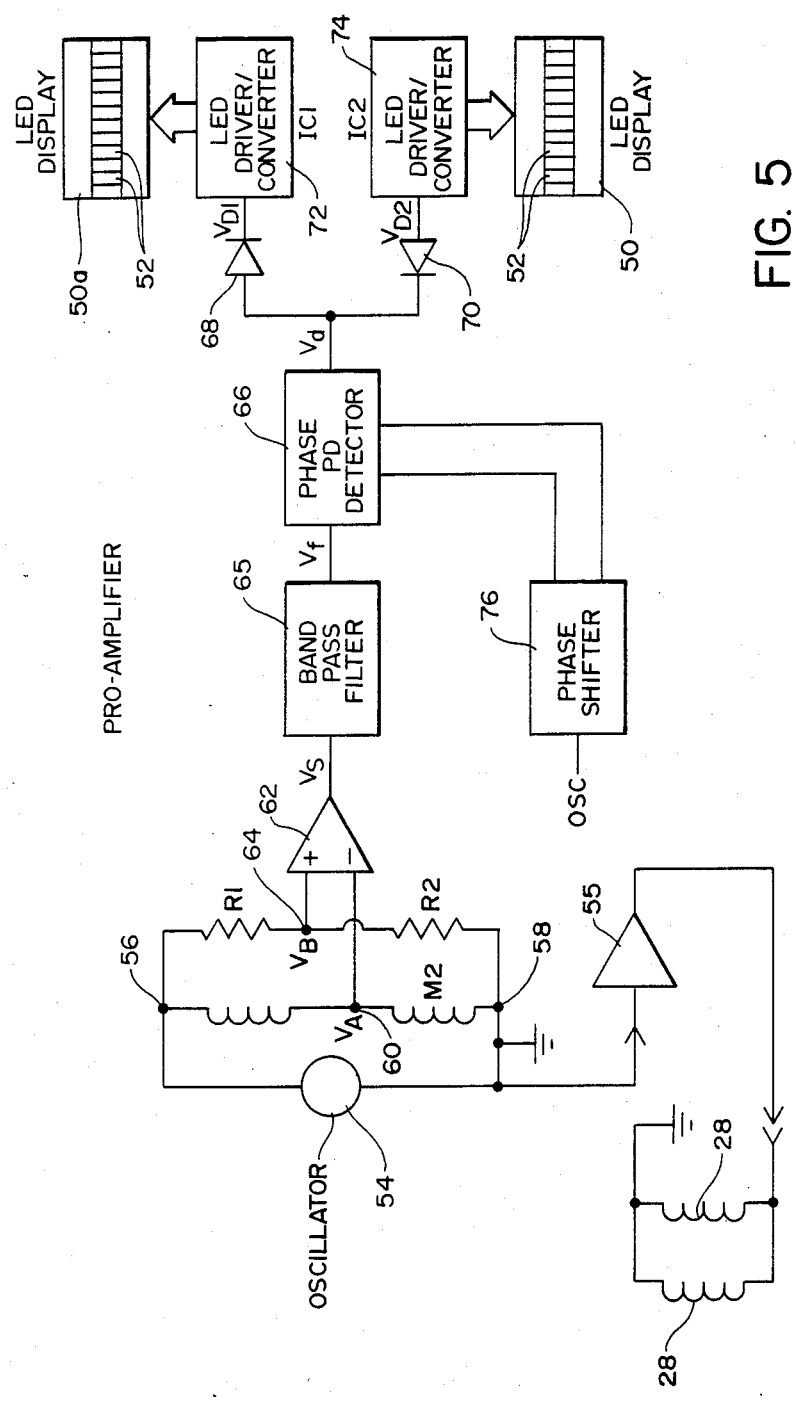
FIG. 5 is a schematic diagram of the circuitry of the present invention.

Reference is now made to FIG. 5, which is a schematic drawing of the circuitry associated with the referencing member 28 and the locating member 30. There is an oscillator 54 which provides an alternating signal of 1000 HZ to both the locating member 30 and the referencing member 28. In the arrangement of FIG. 5, the signal from the oscillator 54 is amplified at 55, with the output from the amplifier 55 being directed to a plurality of referencing members 28 connected in parallel. As will be described later herein, in the particular arrangement of this invention, these several referencing members 28 provide a plurality of oscillating magnetic fields to provide a plurality of reference axes 26 at spaced locations along the periphery of the mandrel 10.

In FIG. 5, there is shown only one pair of diametrically opposed sensors 46a and 46b which are arranged in a bridge circuit with resistors R1 and R2. The oscillating signal is applied at point 56, which is at the juncture of sensor 46a and resistor R1, and also at 58, which is at the juncture of sensor 46b and resistor R2. The point 60 between the two sensors 46a and 46b is connected to one input of a differential amplifier 62, while the connecting point 64 of the two resistors R1 and R2 is connected to the other input of the differential amplifier 62.

The output $V_s$ of the differential amplifier 62 is directed to a band pass filter 65 of conventional design. This band pass filter 65 eliminates external noise and harmonics to produce a voltage $V_f$. The voltage $V_f$ is then applied to a phase detector 66 which is or may be of conventional design. This phase detector 66 operates in a conventional manner to be responsive to both phase and amplitude of the voltage output $V_f$. When the bridge made up of the sensors 46a and 46b and resistors R1 and R2, is balanced, the output from the phase detector 66 is zero. The bridge is in balance when the two sensors 46a and 46b are located equally distant from the referencing member 28, and consequently equally distant from the longitudinal reference axis 32. However, when the locating member 30 is positioned so that one of the sensors 46a and 46b is further from the reference axis 32, the effect of the oscillating magnetic field of the reference member 28 is felt more strongly by the sensor 46a or 46b which is closer to the axis 32 so as to change the relative magnetic fields of the sensors 46a and 46b so as to unbalance the bridge. The components are arranged so that when the sensor 46a is closer to the reference axis 32, the output $V_d$ from the phase detector 66 is a positive full wave signal. When the sensor 46b is closer to the reference axis 32, the output $V_d$ of the phase detector 66 is a negative full wave signal.

The output voltage $V_d$ from the phase detector 66 is applied to two rectifiers 68 and 70. The rectifier 68 is in turn connected to a first LED driver/converter 72, while the other rectifier 70 is connected to a second LED driver/converter 74. The driver/converter 72 is in turn connected to the LED display 50a, while the other driver/converter 74 is connected to a second LED display 50b.

When the output $V_d$ from phase detector 66 is positive, the rectifier 70 is reversed biased and no current flows to the LED driver/converter 74. However, current does flow through the rectifier 68 to the driver/converter 72. The LED driver/converter 72 converts the analog voltage $V_d$ into a digitized signal capable of driving the ten element LED display 50a. On the other hand, when the output $V_d$ from the phase detector 66 is negative, this causes the driver/converter 74 to activate the LED display 50b.

To operate the phase detector 66, it is necessary to impart the reference signal from the oscillator 54 to the phase detector 66. However, as a practical matter, the output from the bridge (i.e. sensors 46a and 46b and resistors R1 and R2) and from the amplifier 62 may create a moderate phase shift in the voltage input $V_f$ to the phase detector 66. Accordingly, there is provided a phase shifter 76 which can be manipulated to shift the phase of the reference signal so that it coincides with the phase of the input voltage $V_f$ to the phase detector 66.

Since each of the components 54 through 76 shown in FIG. 5 can be made of conventional design, a detailed description of these components is not included herein. Further, it is to be understood that the other pair of diametrically opposed sensors 46c and 46d are arranged in a bridge and utilize the same type of circuitry shown in FIG. 5 to activate the other pair of LED displays 50c and 50d.

To describe the overall operation of the present invention, the first step is to properly locate the several referencing members 28. In the particular application shown herein, the several referencing members 28 are positioned at spaced locations along the inside surface 13 of the periphery of the mandrel 10, with the respective reference axes 32 of these referencing members 28 being aligned with the reference lines 26 which collectively define the "water line" of the lay-up mandrel 10. Each referencing member 28 simply comprises a magnetic coil which is wound around a ferrous core, with the coil portion of the referencing member indicated at 78. The coil 78 is connected to a suitable mounting plate 80 which can be attached to the interior surface 13 of the mandrel 10 in any suitable manner, for example, applying adhesive 82 to the mounting plate 80.

Initially, the referencing member 28 is positioned so that the center axis about which the coil 78 is wound is generally aligned with the referencing line 26. However, the location of the longitudinally aligned magnetic field axis of the coil portion 78 may deviate slightly from the longitudinal centerline about which the coil 78 is physically wound. (As used herein, the term "longitudinally aligned magnetic field axis" indicates the center axis of the oscillating magnetic field from which the magnetic lines of flux radiate outwardly.)

The referencing member 28 is located by using a calibrated meter to locate the longitudinal center axis of the magnetic field of the referencing member 28. For ease of description, the meter described in the following paragraph is simply a locating member 30 as described in the present invention, with this locating member 30 having been previously calibrated to insure its accuracy. To properly align the referencing member 28, first the proper reference location 84 of the related reference line 26 is marked on the exterior surface 14 of the mandrel 10. Then the locating member 30 is placed against the mandrel surface 14 in the manner indicated in FIG. 6, so that the pointed tip 44 of the stylus 42 is directly over the reference point 84 on the reference line 26. Then the oscillator 54 is activated to energize the members 28 and 30. Since the locating member 30 is already properly centered on the reference axis 26 and already properly calibrated, any such indication of misalignment would mean that the referencing member 28 has its oscillating magnetic field axis out of alignment. This misalignment is, of course, detected simply by observing the LED displays 50a–d. When such misalignment is detected, the mounting of the referencing member 28 is adjusted slightly to bring the referencing member 28 into proper field alignment and location with the locating member 30.

The next step is to remove the locating member 30 and place a locating fixture 86 on the mandrel 10, this locating fixture 86 corresponding to the thickness and end configuration of the work piece 12. This locating fixture 86 has a marking 88 corresponding to the proper location of the reference line 26 through the fixture 86. The locating member 30 is then placed against the fixture 86 so that the tip 44 of the stylus 42 contacts the point 88. The position and angular orientation of the referencing member 28 is further adjusted so that there is a null reading on the locating member 30.

Figure 6:
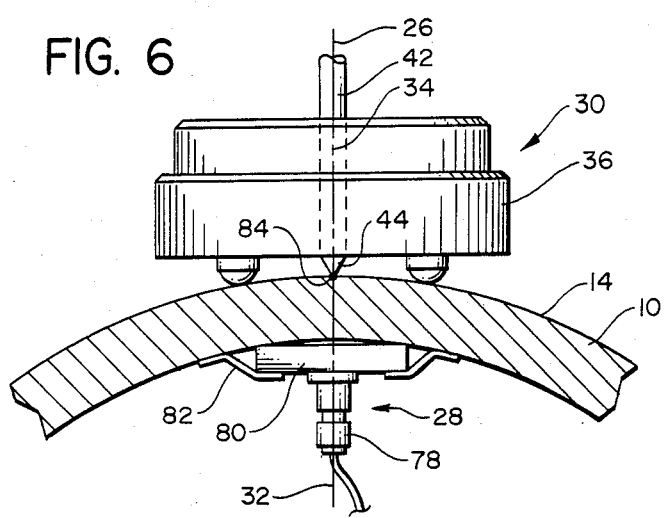
FIG. 6 is a sectional view of the mandrel, illustrating a first step in orienting the referencing member of the present invention.
Figure 7:
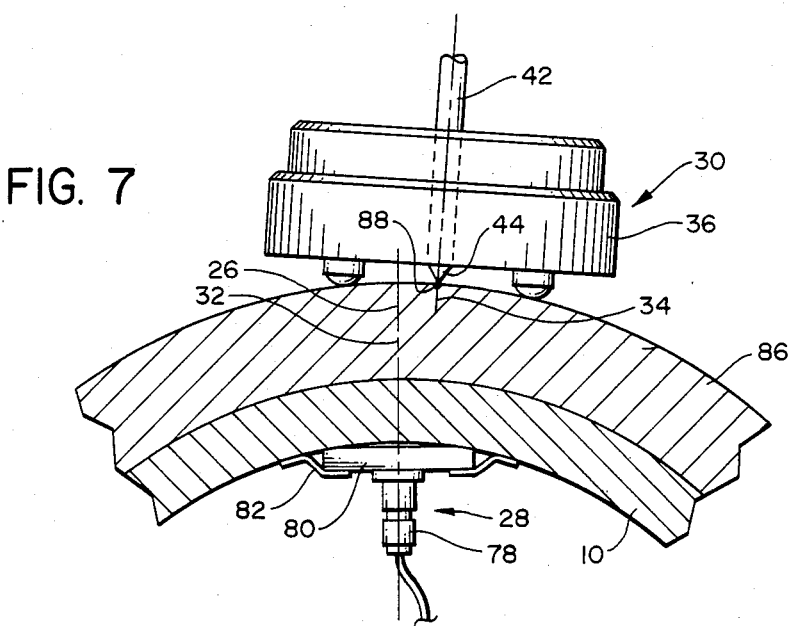
FIG. 7 is a view similar to FIG. 6, showing a second step in locating the referencing member of the present invention.

Then the locating fixture 86 is removed, and the locating member 32 is returned to the position of FIG. 6. If there is still misalignment of the referencing member 28, a further adjustment in the position of the member 28 is made. Then the locating fixture 86 is again applied to the mandrel 10, and the same procedure repeated as indicated with reference to FIG. 7. These steps are repeated until it is indicated that there is proper alignment of the referencing member 28 in both positions. The above process is repeated relative to each of the several referencing members 28 which are placed at spaced locations along the interior surface 13 of the mandrel 10.

The calibrating of the locating member 30 can be accomplished in a manner somewhat similar to the procedure described above relative to locating the referencing member 28. Once the referencing member 28 is properly located, then the locating member 30 can be placed first in position of FIG. 6. Then the components of the locating member 30 can be adjusted to insure that there is a proper null reading on the LED displays 50a–d. The calibrating fixture 86 is then placed on the mandrel 10, the locating member 30 placed in the position of FIG. 7, and then further adjustments made in the locating member 30 to make sure that the locating member 30 is giving a proper null reading. This procedure can be repeated two or more times to insure proper calibration of the locating member 30.

While the precise procedures of fine tuning the locating member 30 are not described in detail herein, it is to be understood that this can be accomplished in a conventional manner. For example, the precise physical location of the sensors 46a–d can be changed slightly relative to the base 38. Further, it would be possible to make the resistors R1 and R2 variable resistors, and these could be adjusted to make sure that the bridge (comprising sensors 46a and 46b and resistors R1 and R2) is properly balanced.

With the referencing members 28 in proper position, and with the locating device 30 properly calibrated, the process of fabricating the work piece 12 can be started. After the initial layers of fiberglass sheets 16 are applied to the mandrel 10 and have cured, the locating device 30 can be positioned in the general area adjacent its associated referencing member 28. The oscillator 54 is activated, and the locating member 30 is moved to a location where the LED displays 50 indicate a null position. (As indicated previously, the diodes of each LED display 50 become lit sequentially as the related sensors 46a-d are moved further from the axis of the oscillating magnetic field of the referencing member 28.)

When the locating member 30 is properly positioned so that its locating axis 34 is coincident with the axis 32 of the referencing member 28, the stylus 42 is depressed to make a mark on the fiberglass layer 16. It is to be noted that the exposed surface of each of the components of the work piece 12 which is being fabricated is symmetrically arranged relative to the related reference axis 26. Thus, the locating member 30 does not become tilted so as to give a false reading when the feet 40 of the member 30 are placed in contact with the surface of the work piece component 12 when the locating axis 34 is in alignment with the reference axis 32. The above process can be repeated relative to the other referencing members 28 which are at other locations along the periphery of the mandrel 10.

Also, it is to be understood that within the broader aspects of the present invention, it is contemplated that the coils of the sensors 46a-d, instead of being energized directly from the oscillator 54, could be energized from the oscillating magnetic field generated by the referencing member 28. Thus, in a sense, the sensors 46a-d would function as aentennas, and the current induced in the coils of the sensors 46a-d would be a function of the location of the coils of the sensors 46a-d to the oscillating magnetic field of the referencing member 28.

It is to be understood that various modifications could be made to the present invention without departing from the basic teachings thereof.

We claim:

1. A system for making a physical identification of a reference location on a work piece, said system comprising:
   a. a base member defining a working area adjacent to said base member, said base member having a reference axis extending from said base member through said working area;
   b. a referencing member at said base member at a first location which is aligned on said reference axis, said referencing member comprising magnetic reference coil means capable of generating an oscillating magnetic field;
   c. a locating device adapted to be positioned at said working area, said device having a locating axis and a plurality of magnetic sensing coil means at spaced locations relative to said locating axis;
   d. energizing means arranged to cause alternating current to flow through said referencing coil means by applying alternating current directly thereto and to cause alternating current to flow through said sensing coil means by applying alternating current directly thereto to create interacting magnetic fields between said referencing coil means and said sensing coil means;
   e. current sensing means operatively connected to said sensing coil means to sense current through said sensing coil means as a function of position of said sensing coil means relative to the referencing coil means and to provide an output corresponding to relative positions of said sensing coil means to said reference coil means.

2. The system as recited in claim 1, wherein said locating device has foot means mounted thereto, said foot means being adapted to engage an exposed surface of a work piece at said working area to orient said locating device relative to said work piece and to said base member.

3. The system as recited in claim 1, wherein there are at least two sensing coil means spaced oppositely relative to said locating axis and said sensing means is arranged to sense relative electric current differences in said two coil sensing means.

4. The system as recited in claim 3, wherein said two sensing coil means are connected in a bridge circuit, and said current sensing means is arranged to sense relative differences of current in said two sensing coil means by detecting an imbalance in said bridge circuit.

5. The system as recited in claim 4, further comprising a differential amplifier to receive an output from said bridge circuit and to provide an output related to imbalance of the bridge circuit, said phase detector to receive the output from the differential amplifier and provide an output related to phase relationship and magnitude of the output from the amplifier, display means to receive the output from the phase detector and to indicate relative magnitude of currents in said two sensing coil means.

6. The system as recited in claim 4, further comprising phase shifter means to apply a reference signal to the phase detector means in proper phase relationship with the output from the differential amplifier.

7. The system as recited in claim 1, wherein there are at least two pair of two sensing coil means, with the sensing coil means of each pair being spaced oppositely from one another relative to the locating axis, and said sensing means is arranged to sense relative electric current differences in the two coil sensing means of each pair.

8. The system as recited in claim 7, wherein the two sensing coil means of each pair are connected in a related bridge circuit, and said current sensing means is arranged to sense relative differences of current in the two sensing coil means of each pair by detecting an imbalance in said bridge circuit.

9. The system as recited in claim 8, further comprising a differential amplifier for each bridge circuit to provide an output related to imbalance of that bridge circuit, a related phase detector for each amplifier to receive an output from its bridge circuit and to provide an output related to phase relationship and magnitude of the output of the amplifier, related display means for each phase detector to receive the output from the phase detector and to indicate relative magnitude of currents in the two sensing coil means of each pair.

10. The system as recited in claim 9, wherein phase shifter means is utilized to apply a reference signal to each phase detector means in proper phase relationship with the output from the differential amplifier.

11. The system as recited in claim 1, wherein said referencing member has a longitudinally aligned oscillating magnetic field axis, and said reference coil means is positioned so that said longitudinal axis is aligned with said reference axis.

12. A method of making a physical identification of a reference location on a work piece, said method comprising:
   a. providing a base member having a reference axis extending from said base member through a working area;

b. locating a referencing member at said base member at a first location which is aligned on said reference axis, said referencing member comprising magnetic reference coil means capable of generating an oscillating magnetic field;

c. placing the work piece in the working area adjacent said base member, said work piece having an exposed surface portion;

d. providing a locating device at said working area adjacent to said exposed surface portion, said device having a locating axis and a plurality of magnetic sensing coil means at spaced locations relative to said locating axis;

e. energizing said referencing coil means by applying alternating current directly thereto and energizing said sensing coil means by applying alternating current directly thereto to cause alternating current to flow through said referencing coil means and said sensing coil means to create interacting alternating magnetic fields between said referencing coil means and said sensing coil means;

f. sensing current through said sensing coil means as a function of position of said sensing coil means relative to said referencing coil means;

g. moving said locating device relative to said reference axis in response to sensing of current in said sensing coil means to bring said locating axis into a predetermined alignment position relative to said reference axis;

h. making a physical identification of location of the locating device relative to the work piece;

whereby location of said work piece relative to the reference axis can be ascertained.

13. The method as recited in claim 12 wherein said locating device is provided with foot means adapted to engage said work piece and orient said locating device relative to said work piece, and said locating device is moved relative to said work piece by engaging the foot means with the work piece.

14. The method as recited in claim 12, wherein there are at least two sensing coil means spaced oppositely relative to said locating axis and location of said locating device is ascertained by sensing relative electric current differences in said two coil sensing means.

15. The method as recited in claim 14, wherein said two sensing coil means are connected in a bridge circuit, and relative differences of current in said two sensing coil means is ascertained by detecting an imbalance in said bridge circuit.

16. The method as recited in claim 15, wherein an output from said bridge circuit is directed to a differential amplifier to provide an output related to imbalance of the bridge circuit, said method further comprising directing an output from the differential amplifier to a phase detector which provides an output related to phase relationship and magnitude of the output from the amplifier, then directing an output from the phase detector to display means to indicate relative magnitude of currents in said two sensing coil means.

17. The method as recited in claim 16, further comprising utilizing phase shifter means to apply a reference signal to the phase detector means in proper phase relationship with the output from the differential amplifier.

18. The method as recited in claim 12, wherein there are at least two pair of two sensing coil means, with the sensing coil means of each pair being spaced oppositely from one another relative to the locating axis, and location of said locating device is ascertained by sensing relative electric current differences in the two coil sensing means of each pair.

19. The method as recited in claim 18, wherein the two sensing coil means of each pair are connected in a related bridge circuit, and relative differences of current in the two sensing coil means of each pair is ascertained by detecting an imbalance in said bridge circuit.

20. The method as recited in claim 19, wherein an output from each bridge circuit is directed to a differential amplifier to provide an output related to imbalance of that bridge circuit, said method further comprising directing an output from that differential amplifier to a related phase detector which provides an output related to phase relationship and magnitude of the output of the amplifier, then directing an output from the phase detector to related display means to indicate relative magnitude of currents in the two sensing coil means of each pair.

21. The method as recited in claim 20, wherein phase shifter means are utilized to apply a reference signal to the phase detector means in proper phase relationship with the output from the differential amplifier.

22. The method as recited in claim 12, wherein said referencing member has a longitudinally aligned oscillating magnetic field axis, and said reference coil means is positioned so that said longitudinal axis is aligned with said reference axis.

* * * * *